(12) United States Patent
Sangu et al.

(10) Patent No.: US 11,253,952 B2
(45) Date of Patent: Feb. 22, 2022

(54) LASER PROCESSING APPARATUS

(71) Applicant: Samsung Display Co., Ltd., Yongin-si (KR)

(72) Inventors: Akifumi Sangu, Hwaseong-si (KR); Alexander Voronov, Suwon-si (KR); Hyoung-Joo Kim, Anyang-si (KR); Eun Sun Choi, Seoul (KR); Emil Aslanov, Asan-si (KR); Gyoo Wan Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 446 days.

(21) Appl. No.: 16/408,276

(22) Filed: May 9, 2019

(65) Prior Publication Data
US 2020/0101560 A1 Apr. 2, 2020

(30) Foreign Application Priority Data

Oct. 1, 2018 (KR) .................. 10-2018-0117043

(51) Int. Cl.
| | |
|---|---|
| B23K 26/064 | (2014.01) |
| G02B 27/00 | (2006.01) |
| B23K 26/06 | (2014.01) |
| G02B 26/10 | (2006.01) |
| B23K 26/0622 | (2014.01) |

(Continued)

(52) U.S. Cl.
CPC ...... *B23K 26/0648* (2013.01); *B23K 26/0624* (2015.10); *B23K 26/0643* (2013.01); *B23K 26/0665* (2013.01); *B23K 26/0734* (2013.01); *B23K 26/083* (2013.01);
(Continued)

(58) Field of Classification Search
CPC ........... B23K 26/0648; B23K 26/0624; B23K 26/0665; B23K 26/0734; B23K 26/083; G02B 26/105; G02B 27/0025
See application file for complete search history.

(56) References Cited

U.S. PATENT DOCUMENTS

| | | | | |
|---|---|---|---|---|
| 4,327,972 A | * | 5/1982 | Brunsting | ............. G02B 27/09 359/642 |
| 4,518,232 A | * | 5/1985 | Dagenais | ............. B23K 26/073 219/121.74 |

(Continued)

FOREIGN PATENT DOCUMENTS

| | | |
|---|---|---|
| JP | 04-049682 | 2/1992 |
| JP | 2015-166094 | 9/2015 |

(Continued)

*Primary Examiner* — Geoffrey S Evans
(74) *Attorney, Agent, or Firm* — Lewis Roca Rothgerber Christie LLP

(57) ABSTRACT

A laser processing apparatus includes a light source configured to generate a laser beam, and a light converging optical system configured to converge laser beam to a focal point at an object to be processed, the light converging optical system including a through-hole optical element and a composite optical element under the through-hole optical element, wherein the through-hole optical element includes a first recess portion configured as a concave mirror at a lower surface of the through-hole optical element, and wherein an upper surface of the composite optical element is convex and includes a first region configured to reflect the laser beam and a second region configured to transmit the laser beam.

20 Claims, 13 Drawing Sheets

(51) Int. Cl.
 *B23K 26/08* (2014.01)
 *B23K 26/073* (2006.01)
 *B23K 26/082* (2014.01)

(52) U.S. Cl.
 CPC ........ *B23K 26/0821* (2015.10); *G02B 26/105* (2013.01); *G02B 27/0025* (2013.01)

(56) References Cited

U.S. PATENT DOCUMENTS

| | | | |
|---|---|---|---|
| 4,749,840 A * | 6/1988 | Piwczyk | B23K 26/02 |
| | | | 219/121.68 |
| 5,449,882 A * | 9/1995 | Black | B23K 26/032 |
| | | | 219/121.74 |
| 6,583,382 B2 * | 6/2003 | Chen | B41J 2/162 |
| | | | 219/121.7 |
| 9,439,275 B2 | 9/2016 | Moriya et al. | |
| 2014/0016662 A1 | 1/2014 | Schad et al. | |

FOREIGN PATENT DOCUMENTS

| | | |
|---|---|---|
| KR | 10-2004-0006726 | 1/2004 |
| KR | 10-2014-0022379 | 2/2014 |
| WO | WO 2012-110389 A1 | 8/2012 |

* cited by examiner

LASER PROCESSING APPARATUS

CROSS-REFERENCE TO RELATED APPLICATION

This application claims priority to and the benefit of Korean Patent Application No. 10-2018-0117043, filed in the Korean Intellectual Property Office on Oct. 1, 2018, the entire content of which is incorporated herein by reference.

BACKGROUND

1. Field

The present disclosure relates to a laser processing apparatus.

2. Description of the Related Art

Laser processing techniques have been applied to various applications such as forming a groove on a surface of an object to be processed (i.e., the target object) by irradiating the object with a laser, forming a dense layer inside the object, or changing a material characteristic of the object to be processed.

As a tendency toward high density, high integration, and high definition becomes clear in the fields of semiconductors and displays, the need for a laser process technique of super high definition and speed is expanding. In addition, pulsed lasers have been attracting attention for achieving a large instantaneous output for improving laser processability. Recently, a pulse duration of the pulsed laser has been gradually shortened from a nanosecond to a femtosecond.

In a field where the super-precision processability is desired, it is desirable to adjust a focal point position of the laser beam to obtain a highest light energy and a smallest beam spot size so that the object to be processed is accurately processed.

When the laser beam is transmitted through a transmissive lens, a chromatic aberration occurs due to a difference in refractive indexes between the wavelengths, and the position of the focal point changes according to the wavelength. Since the laser beam has a tendency to broaden a spectral bandwidth as the pulse duration becomes shorter, processing quality deterioration, a defect of the object to be processed, low productivity, etc. may be caused due to the influence of the chromatic aberration as the pulse duration of the laser beam is shortened.

The above information disclosed in this Background section is for enhancement of understanding of the background of the invention, and therefore, it may contain information that does not form the prior art that is already known in this country to a person of ordinary skill in the art.

SUMMARY

Aspects of embodiments of the present invention are directed to a laser processing apparatus with improved laser processing quality, laser processing accuracy, and productivity.

According to some embodiments of the present invention, there is provided a laser processing apparatus including: a light source configured to generate a laser beam; and a light converging optical system configured to converge laser beam to a focal point at an object to be processed, the light converging optical system including a through-hole optical element and a composite optical element under the through-hole optical element, wherein the through-hole optical element includes a first recess portion configured as a concave mirror at a lower surface of the through-hole optical element, and wherein an upper surface of the composite optical element is convex and includes a first region configured to reflect the laser beam and a second region configured to transmit the laser beam.

In some embodiments, the through-hole optical element has a through hole penetrating a center of the through-hole optical element.

In some embodiments, the composite optical element includes a second recess portion that is concave at a lower surface of the composite optical element, the second recess portion being configured to transmit the laser beam.

In some embodiments, the light converging optical system further includes a cover between the composite optical element and the object.

In some embodiments, the laser processing apparatus further includes: a position adjustment optical system on a path of the laser beam and configured to adjust an irradiation position of the laser beam on the object, wherein the position adjustment optical system includes a first galvano mirror configured to determine a position of the focal point on the object along an x axis, and a second galvano mirror configured to determine a position of the focal point on the object along a y axis crossing the x axis.

In some embodiments, the position adjustment optical system further includes a controller configured to control positions and angles of the first and second galvano mirrors.

In some embodiments, the laser processing apparatus further includes: a galvano mirror configured to adjusting a position of the focal point on the object along both an x axis and y axis crossing the x axis.

In some embodiments, the laser beam is a pulsed laser beam.

In some embodiments, the laser beam has a pulse duration of femtoseconds.

In some embodiments, a shape of the first region is circular, elliptical, or polygonal.

In some embodiments, the object includes a non-active region where the laser beam does not reach and an active region where the laser beam converges at the focal point.

In some embodiments, the object is fixed to a stage to be movable.

In some embodiments, a curvature of the first region and the second region of the composite optical element is larger than a curvature of the second recess portion.

In some embodiments, a curvature of the first region and the second region of the composite optical element is a same as a curvature of the second recess portion.

In some embodiments, a curvature of the first region and the second region of the composite optical element is smaller than a curvature of the second recess portion.

In some embodiments, an upper surface of the through-hole optical element has a flat part.

In some embodiments, the upper surface or the second recess portion of the composite optical element is spherical.

In some embodiments, the upper surface or the second recess portion of the composite optical element is aspherical.

According to some embodiments of the present invention, there is provided a laser processing apparatus including: a light source configured to generate a laser beam; and a light converging optical system configured to generate a focal point at an object to be processed, the light converging optical system includes a through-hole optical element having a through hole penetrating the through-hole optical element, a composite optical element between the through-hole optical element and the object, and an optical element moving device, wherein an upper surface of the through-hole optical element is flat, and a thickness of the through-hole optical element is thickest at an edge of the through-hole optical element and thinnest at a center of the through-hole optical element, and a lower surface of the through-hole optical element is configured to reflect the laser beam, wherein curvature centers of an upper surface and a lower surface of the composite optical element are under the composite optical element, the upper surface of the composite optical element including a first region configured to reflect the laser beam and a second region configured to transmit the laser beam, the lower surface of the composite optical element being configured to transmit the laser beam incident from the second region, and wherein the through-hole optical element and the composite optical element are movable by the optical element moving device.

In some embodiments, the laser processing apparatus further includes a position adjustment optical system configured to adjust a path of the laser beam generated from the light source, the position adjustment optical system including a galvano mirror.

According to exemplary embodiments, as the position of the focal point is prevented or substantially prevented from being changed for each wavelength of the laser beam by the chromatic aberration, processing quality, processing accuracy, and productivity of the laser processing apparatus may be improved.

DETAILED DESCRIPTION

Figure 1:
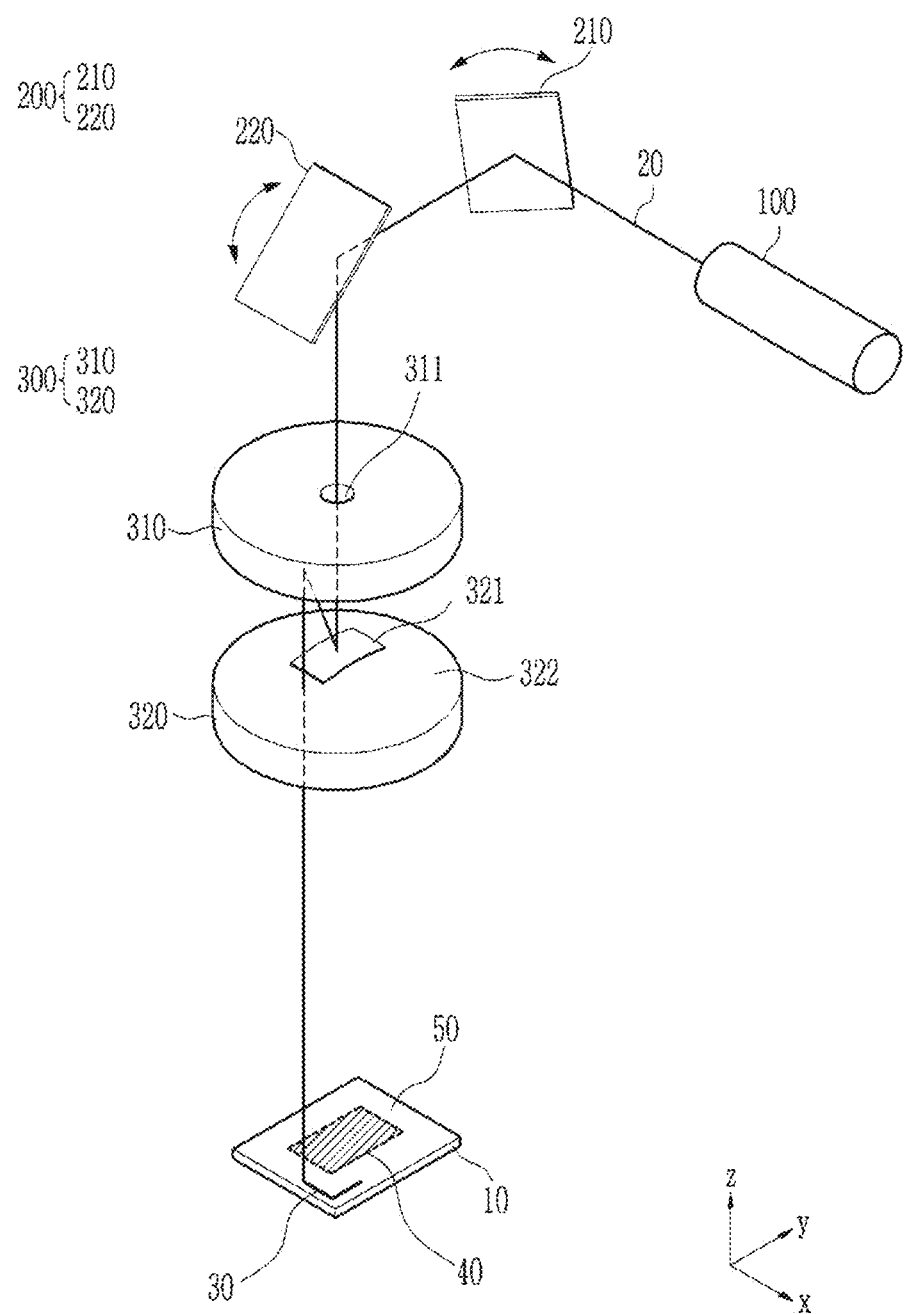
FIG. 1 is a schematic diagram of a laser processing apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various suitable ways, all without departing from the spirit or scope of the present invention.

The drawings and description are to be regarded as illustrative in nature and not restrictive. Like reference numerals designate like elements throughout the specification.

Further, in the drawings, size and thickness of each element may be arbitrarily represented or exaggerated for better understanding and ease of description, and the present invention is not limited thereto. In the drawings, the thickness of layers, films, panels, regions, etc., may be exaggerated for clarity. In the drawings, the thickness of layers, films, panels, regions, etc., may be exaggerated for convenience of description.

First, a moving path of a laser beam in a laser processing apparatus according to an exemplary embodiment of the present invention is schematically described with reference to FIG. 1. FIG. 1 is a schematic diagram of a laser processing apparatus according to an exemplary embodiment of the present invention.

A laser processing apparatus according to an exemplary embodiment includes a light source 100, a position adjustment optical system 200, and a light converging optical system 300.

The light source 100 generates a laser beam 20 for processing an object to be processed 10. The laser beam 20 may be an ultra-short pulse laser having a pulse duration of picoseconds or femtoseconds.

The ultra-short pulse laser has very high energy density and may process an object to be processed 10 made of various suitable materials. Further, a physical-chemical transformation and processing accuracy deterioration due to heat diffusion during processing of the object to be processed 10 may not be generated. The ultra-short pulse laser may omit a step of removing by-products such as ultrasonic wave cleaning because stacking of particles by the processing and by-products such as craters are hardly generated.

In addition, the ultra-short pulse laser may process materials with high heat transfer coefficients or low light absorption rates, and may also easily process an object to be processed 10 in which two or more materials are mixed, or which includes a composite material stacked with multi-layers, in a single process. On the other hand, the laser beam 20 may be a laser beam 20 of kinds other than the above-described ultra-short pulse laser. For example, the laser beam 20 may be a pulsed laser or a continuous wave laser with a pulse duration of nanoseconds.

The position adjustment optical system 200 is positioned on the path of the laser beam 20 generated from the light source 100 to change the path of the laser beam 20.

The position adjustment optical system 200 may be a galvano scanner. The position adjustment optical system 200 includes a first galvano mirror 210 and a second galvano mirror 220. The first galvano mirror 210 and the second galvano mirror 220 are composed of rotatable reflective mirrors, which reflect the laser beam 20 within a certain range of angles by rotating the mirror.

The laser beam 20 produced by the light source 100 is reflected with a set or predetermined angle by the first galvano mirror 210. When the first galvano mirror 210 rotates about one axis, the angle of incidence of the laser beam 20 for the reflecting surface of the first galvano mirror 210 changes, and accordingly the path of the reflected laser beam 20 is determined.

The laser beam 20 reflected from the first galvano mirror 210 is reflected with the set or predetermined angle in the second galvano mirror 220. The rotational axis of the second galvano mirror 220 is in a direction across the rotational axis of the first galvano mirror 210. Depending on the rotation of the second galvano mirror 220, the incidence angle of the laser beam 20 for the reflection surface of the second galvano mirror 220 changes and the path of the reflected laser beam 20 is determined. Accordingly, the first galvano mirror 210 and the second galvano mirror 220 are rotated and the radiation angle of the laser beam 20 may be determined (e.g., adjusted or set), and the position of the focal point of the laser beam 20 on the object to be processed 10 may be adjusted.

When the object to be processed 10 is positioned in the xy plane in a three-dimensional space consisting of x, y, and z axes, the first galvano mirror 210 may adjust the position, along the x axis, of the focal point of the laser beam 20 formed at the object to be processed 10, and the second galvano mirror 220 may adjust the position, along the y axis, of the focal point of the laser beam 20 formed at the object to be processed 10.

It is described that the first galvano mirror 210 controls the irradiation position, on the x axis, of the laser beam 20 and the second galvano mirror 220 controls (e.g., sets or adjusts) the irradiation position along the y axis, however embodiments of the present invention are not limited thereto. For example, it the first galvano mirror 210 may control the position along they axis, and the second galvano mirror 220 may control the position along the x axis. Also, the position adjustment optical system 200 may not include a plurality of galvano mirrors, and in some examples the focal point position along the x axis and the y axis may be concurrently (simultaneously) controlled (e.g., set or adjusted) by using a single galvano mirror.

According to an exemplary embodiment, a first controller for controlling the first galvano mirror 210 and a second controller for controlling the second galvano mirror 220 may be further included. The first controller and the second controller control the position and the angle of the first galvano mirror 210 and the second galvano mirror 220, respectively, so that the laser beam 20 may be radiated toward the processing position.

The light converging optical system 300 is positioned on the path of the laser beam 20 passing through the position adjustment optical system 200, and focuses the laser beam 20 at the focal point on the object to be processed 10. The light converging optical system 300 includes a through-hole optical element 310 and a composite optical element 320 positioned below the through-hole optical element 310.

The through-hole optical element 310 includes a through hole (e.g., an opening) 311 penetrating from the upper surface to the lower surface of the through-hole optical element 310. The laser beam 20 of which the path is adjusted by the position adjustment optical system 200 passes through the through hole 311 of the through-hole optical element 310.

The composite optical element 320 is disposed between the through-hole optical element 310 and the object to be processed 10. The upper surface of the composite optical element 320 is convex upward, and includes a first region 321 disposed at the center of the upper surface and a second region 322 disposed around the first region 321. The first region 321 of the composite optical element 320 is formed as a reflection layer, a reflection coating, or a reflection film, and reflects the laser beam 20, and the second region 322 transmits the laser beam 20.

The laser beam 20 passing through the through hole 311 of the through-hole optical element 310 is reflected from the first region 321 of the composite optical element 320. The laser beam 20 reflected at the first region 321 of the composite optical element 320 is again reflected by the lower surface of the through-hole optical element 310 and transmits through the composite optical element 320 at the second region 322 of the composite optical element 320, thereby forming the focal point on the object to be processed 10.

According to an exemplary embodiment, the light converging optical system 300 may further include an optical element moving device so that the through-hole optical element 310 and the composite optical element 320 are movable. The through-hole optical element 310 and the composite optical element 320 may be moved together as one body or may be separately and independently moved by the optical element moving device. As a result, the focal point can be more easily formed on the object to be processed 10 by adjusting the distance between the through-hole optical element 310 and the composite optical element 320, or the distance between the composite optical element 320 and the object to be processed 10.

The light converging optical system 300 may further include a cover disposed between the composite optical element 320 and the object to be processed 10. The cover transmits all the incident laser beams 20, and may have a function of preventing or substantially reducing contamination of the through-hole optical element 310 and the composite optical element 320, which may result during processing and protecting the through-hole optical element 310 and the composite optical element 320.

The laser beam 20 generated from the light source 100 and sequentially passing through the position adjustment optical system 200 and the light converging optical system 300 is collected to form the focal point at the position to be processed of the object to be processed 10. The object to be processed 10 may be fixed to a stage that is capable of multi-axis movement so that the relative position may be adjusted so that the focal point of the laser beam 20 may be positioned at the processing position of the object to be processed 10.

The object to be processed 10 contains an active region 50 where the focal point of the laser beam 20 may be positioned. A two-dimensional pattern may be processed on the active region 50 by adjusting the path of the laser beam 20 by the position adjustment optical system 200. A processing trace 30 is formed in the region where the focal point of the laser beam 20 passes over the object to be processed 10.

A non-active region 40 where the focal point of the laser beam 20 may not be positioned exists at the object to be processed 10. The first region 321 of the composite optical element 320 does not transmit the laser beam 20 but reflects the laser beam 20 in the direction in which the through-hole optical element 310 is positioned. As a result, the focal point may be at a partial region of the object to be processed 10 disposed below the first region 321.

The non-active region 40 may have a shape of which the first region 321 of the composite optical element 320 is projected onto the object to be processed 10. For example, if the first region 321 of the composite optical element 320 has a long rectangle shape in the y-axis direction, the non-active region 40 of the object to be processed 10 may also have a long rectangle shape in the y-axis direction. Also, the shape of the non-active region 40 may not be exactly the same as the shape of the first region 321 of the composite optical element 320 projected onto the object 10 to be processed because of reflection and refraction of the laser beam 20, and it may be a distorted shape. Since the region to be processed should not be included in the non-active region 40, the position, size, or shape of the first region 321 may be determined according to the position, size, and shape to be processed on the object to be processed 10.

The through-hole optical element 310 will now be described in detail with reference to FIG. 2 to FIG. 5.

Figure 2:
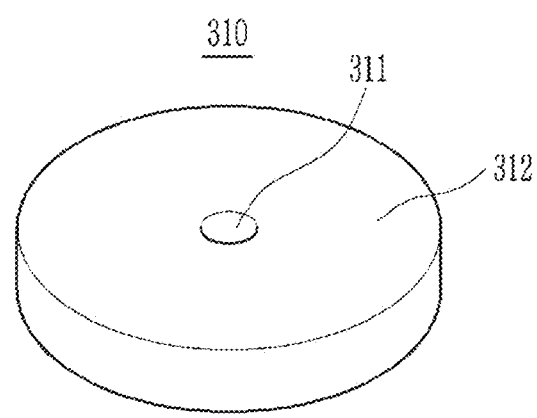
FIG. 2 is a perspective view of a through-hole optical element according to an exemplary embodiment of the present invention as viewed from above.

FIG. 2 is a perspective view of a through-hole optical element according to an exemplary embodiment of the present invention as viewed from above.

Referring to FIG. 2, the through-hole optical element 310 includes the through hole 311 passing through the upper surface and the lower surface at the center, and the upper surface of the through-hole optical element 310 includes a flat part 312.

As shown in FIG. 1, the laser beam 20 passing through the position adjustment optical system 200 passes through the through-hole optical element 310 through the through hole 311 without being refracted. As a result, in the laser processing apparatus according to an exemplary embodiment of the present invention, the laser beam 20 is not directly incident on the flat part 312 of the through-hole optical element 310.

Figure 3:
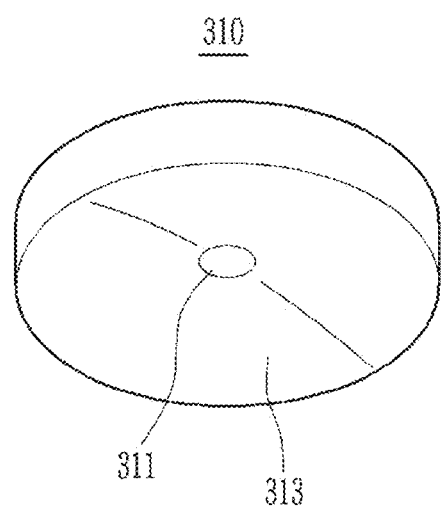
FIG. 3 is a perspective view of a through-hole optical element according to an exemplary embodiment of the present invention as viewed from below.

FIG. 3 is a perspective view of a through-hole optical element according to an exemplary embodiment of the present invention as viewed from below.

Referring to FIG. 3, the lower surface of the through-hole optical element 310 has a concave shape and includes the through hole 311 passing through the upper surface of the through-hole optical element 310 at the center thereof. The lower surface of the through-hole optical element 310 includes a first recess portion 313 positioned at the periphery of the through hole 311. The first recess portion 313 is a concave mirror. Accordingly, the laser beam entering at a non-parallel and non-normal angle (e.g., entering by an oblique line) in the first recess portion 313 is reflected in a non-spread gathering direction.

The first recess portion 313 of the through-hole optical element 310 may be a spherical concave mirror having an inner surface of the sphere as the reflection surface. However embodiments of the present invention are not limited thereto and, according to some examples, the first recess portion 313 of the through-hole optical element 310 may be an aspherical (i.e., non-spherical) concave mirror. In the case of the aspherical concave mirror, a spherical aberration may be reduced compared to the spherical concave mirror, thereby allowing more precise processing.

Figure 4:
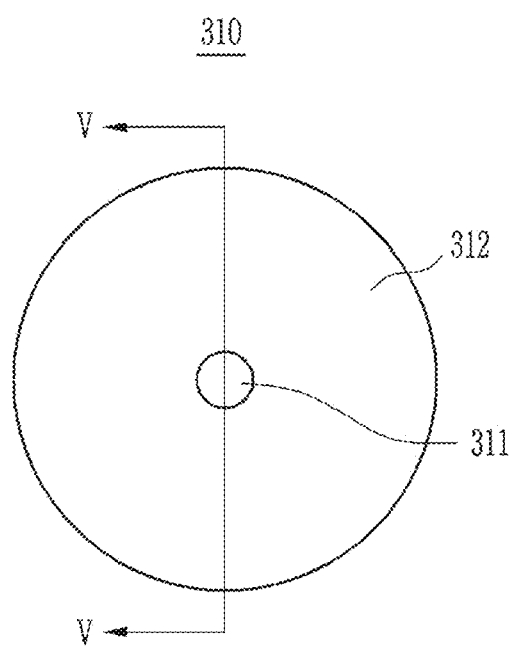
FIG. 4 is a top plan view of a through-hole optical element according to an exemplary embodiment of the present invention.

FIG. 4 is a top plan view of a through-hole optical element according to an exemplary embodiment of the present invention.

Referring to FIG. 4, the flat part 312 of the through-hole optical element 310 is circular. However embodiments of the present invention are not limited thereto and, according to some examples, the flat part 312 of the through-hole optical element 310 may be elliptical, polygonal, or have any other suitable shape.

The through hole 311 is disposed at the center of the flat part 312 in the plane view of the through-hole optical element 310. However embodiments of the present invention are not limited thereto and, according to some examples, the through hole 311 is not be disposed at the center of the flat part 312 and may be positioned at any suitable position in the plane view. The through hole 311 of the through-hole optical element 310 is circular. However embodiments of the present invention are not limited thereto and, according to some examples, the through hole 311 may be elliptical, polygonal, or have any other suitable shape.

Figure 5:
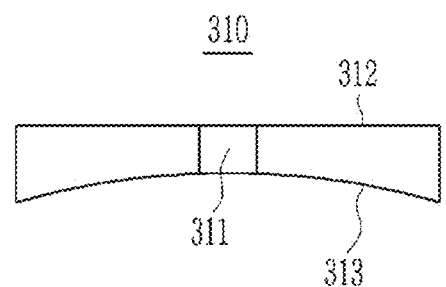
FIG. 5 is a cross-sectional view of a through-hole optical element taken along the line V-V of FIG. 4.

The cross-section of the through-hole optical element 310 is described with reference to FIG. 5. FIG. 5 is a cross-sectional view of a through-hole optical element taken along the line V-V of FIG. 4.

As described above, the flat part 312 of the through-hole optical element 310 is flat and the first recess portion 313 has the concave shape. The through-hole optical element 310 becomes thinner toward the center. In other words, the thickness of the edge portion (e.g., a portion farthest away from the center) of the through-hole optical element 310 is the thickest, and the thickness of the central portion is the thinnest. The through-hole optical element 310 includes the through hole 311 passing through the upper surface and the lower surface.

Next, the composite optical element 320 is described in detail with reference to FIG. 6 to FIG. 9.

Figure 6:
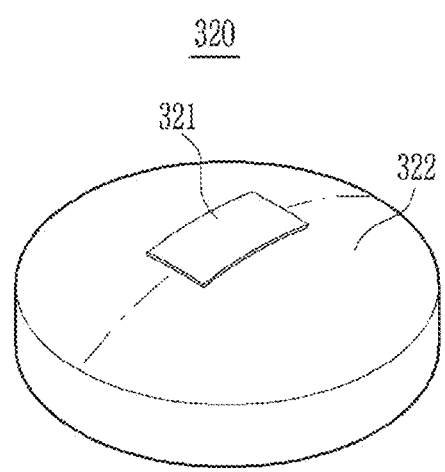
FIG. 6 is a perspective view of a composite optical element according to an exemplary embodiment of the present invention as viewed from above.

FIG. 6 is a perspective view of a composite optical element according to an exemplary embodiment of the present invention as viewed from above.

Referring to FIG. 6, the upper surface of the composite optical element 320 has the convex shape. The composite optical element 320 includes the first region 321 disposed at the center of the upper surface of the composite optical element 320 and the second region 322 disposed at the periphery of the first region 321. The first region 321 reflects the laser beam 20 and the second region 322 transmits the laser beam 20. The first region 321 serves as a convex mirror, and the second region 322 serves as a convex lens. The second region 322 of the composite optical element 320 is configured as a convex lens so that the laser beam incident on the second region 322 may be condensed without spreading. The first region 321, which is a convex mirror, and the second region 322, which is a convex lens disposed on the periphery of the convex mirror, are integrally formed.

The first region 321 and the second region 322 of the composite optical element 320 may be formed by applying a highly reflective coating to the center of the upper surface of the convex lens. However, the composite optical element 320 may also be formed by any suitable method to have the characteristic that the laser beam 20 is reflected by the first region 321 and the laser beam 20 is transmitted through at the second region 322.

The upper surface of the composite optical element 320 may be spherical. However embodiments of the present invention are not limited thereto and, according to some examples, the upper surface of the composite optical element 320 may be aspherical. If the upper surface of the composite optical element 320 is aspherical, the spherical aberration may be reduced compared with the case of the spherical surface, thereby enabling more precise processing.

Figure 7:
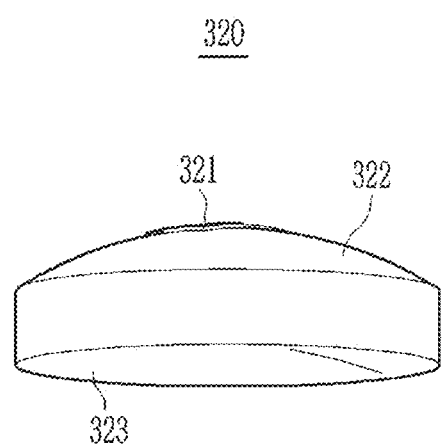
FIG. 7 is a perspective view of a composite type of optical element according to an exemplary embodiment of the present invention as viewed from below.

FIG. 7 is a perspective view of a composite type of optical element according to an exemplary embodiment of the present invention as viewed from below.

Referring to FIG. 7, the lower surface of the composite optical element 320 has a concave shape and includes a second recess portion 323. The second recess portion 323 is the concave lens. The second recess portion 323 transmits the laser beam 20 differently from the first recess portion 313 of the through-hole optical element 310. The second recess portion 323 may be spherical. However, the second recess portion 323 may also be aspherical according to some examples.

Figure 8:
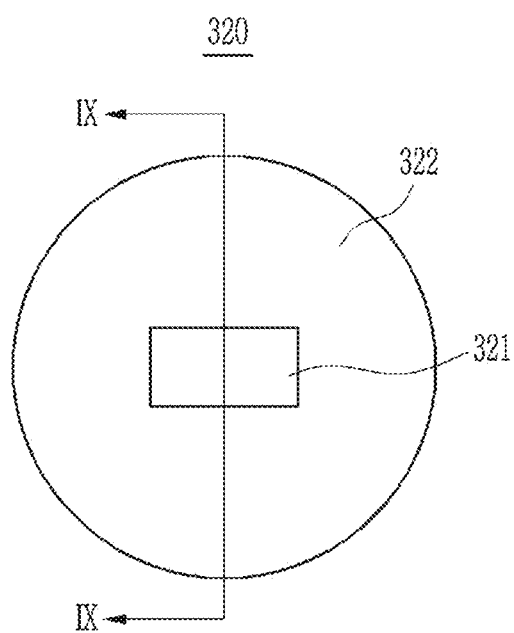
FIG. 8 is a top plan view of a composite optical element according to an exemplary embodiment of the present invention.

FIG. 8 is a top plan view of a composite optical element according to an exemplary embodiment of the present invention.

Referring to FIG. 8, the upper surface of the composite optical element 320 is circular from a top plan view. However embodiments of the present invention are not limited thereto and, according to some examples, the planar shape of the composite optical element 320 may be any suitable shape, such as an elliptical shape, a polygonal shape, or the like.

The first region 321 reflecting the laser beam 20 is disposed at the center of the upper surface of the composite optical element 320. The first region 321 is rectangular. However, this is an example, and the first region 321 may have any suitable shape, such as a circular shape, an elliptical shape, a polygonal shape, or the like. As described above, the position, size, and shape of the first region 321 may be determined depending on the position, size, and shape to be processed on the object to be processed 10.

Figure 9:
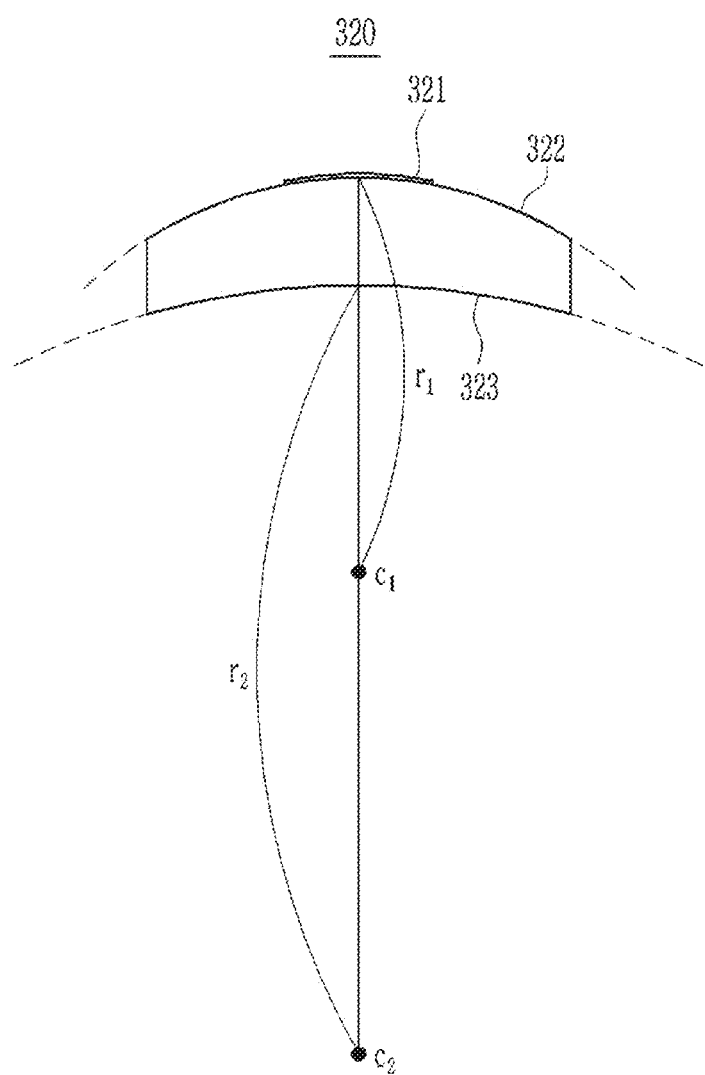
FIG. 9 is a cross-sectional view of a composite optical element taken along the line IX-IX of FIG. 8.

The cross-sectional view of the composite optical element 320 is described with reference to FIG. 9. FIG. 9 is a cross-sectional view of a composite optical element taken along the line IX-IX of FIG. 8.

The upper surface of the composite optical element 320 is convex and the lower surface is concave. A curvature center c1 of the upper surface of the composite optical element 320 and a curvature center c2 of the lower surface are both positioned below the composite optical element 320.

The curvature of the upper surface of the composite optical element 320 is larger than the curvature of the lower surface. That is, the curvature of the first region 321 and the second region 322 of the composite optical element 320 is larger than the curvature of the second recess portion 323. Since the curvature radius is inversely proportional to the curvature, the curvature radius r1 of the first region 321 and the second region 322 of the composite optical element 320 is smaller than the curvature radius r2 of the second recess portion 323. Herein, the curvature at a particular point along a curved line may be a measure of the sensitivity of its tangent line to moving the point to a nearby point, the center of a curvature may refer to an intersection point of two infinitely close normals to the curved line, and the curvature radius at a particular point along the curved line may refer to a distance from the particular point to the center of curvature.

As a result, the composite optical element 320 becomes thicker from the edge toward the center. The composite optical element 320 is the thinnest at the edge and the thickest at the center.

However embodiments of the present invention are not limited thereto and according to some examples, the curvature of the first region 321 and the second region 322 of the composite optical element 320 may be equal to the curvature of the second recess portion 323, or the curvature of the first region 321 and the second region 322 may be smaller than the curvature of the second recess portion 323. In other words, the curvature radius r1 of the first region 321 and the second region 322 of the composite optical element 320 may be equal to the curvature radius r2 of the second recess portion 323, or the curvature radius r1 of the first region 321 and the second region 322 may be greater than the curvature radius r2 of the second recess portion 323. In this case, the thickness of the composite optical element 320 may be uniform, or the composite optical element 320 may be the thickest at the edge and thinnest at the center.

Figure 10:
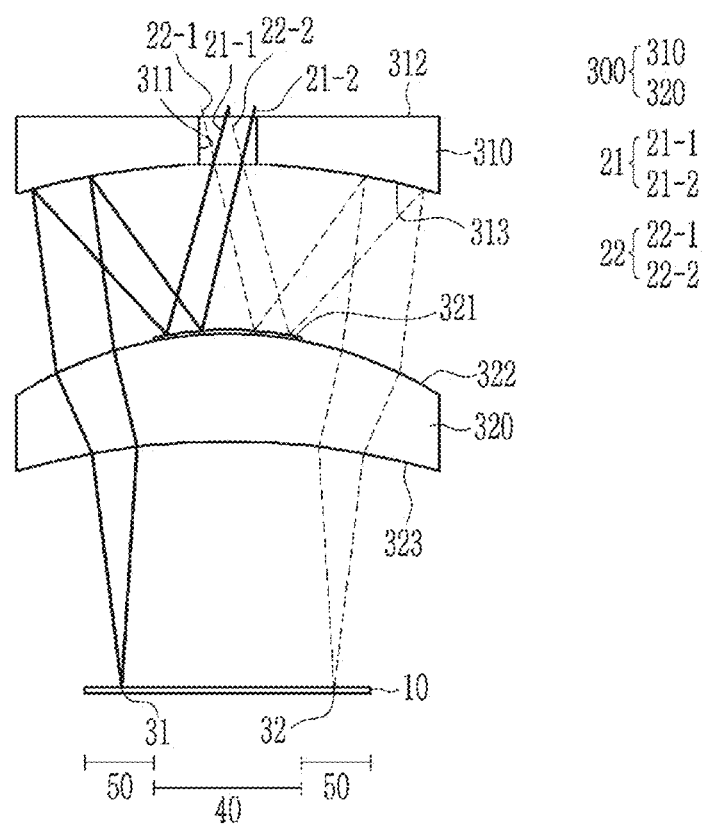
FIG. 10 is an explanatory diagram of a light converging optical system shown in FIG. 1.

The path of the laser beam 20 passing through the light converging optical system 300 is described with reference to FIG. 10. FIG. 10 is an explanatory diagram of the light converging optical system 300.

FIG. 10 represents the proceeding path of a first laser beam 21 of which the path is adjusted to form the focal point at a first focal point position 31 of the object to be processed 10 and the proceeding path of a second laser beam 22 of which the path is adjusted to form the focal point at a second focal point position 32.

First, the proceeding path of the first laser beam 21 is described through the proceeding path of a first ray 21-1 and a second ray 21-2. The first laser beam 21 is a collection of numerous rays, of which the first ray 21-1 and the second ray 21-2 are discussed.

The first ray 21-1 and the second ray 21-2 pass through the through-hole optical element 310 through the through hole 311. Since the through hole 311 penetrates the upper surface and the lower surface of the through-hole optical element 310, the first ray 21-1 and the second ray 21-2 proceed without being refracted when passing through the hole 311.

The first ray 21-1 and the second ray 21-2 passing through the through-hole optical element 310 through the through hole 311 are reflected in the first region 321 of the composite optical element 320. Since the first region 321 is the convex mirror, the first ray 21-1 and the second ray 21-2 reflected from the first region 321 proceed in the direction toward the outer periphery of the composite optical element 320 more than when reflected from the plane mirror.

The first ray 21-1 and the second ray 21-2 reflected at the first region 321 are reflected again at the first recess portion 313 of the through-hole optical element 310. The first ray 21-1 and the second ray 21-2 reflected from the first recess portion 313 proceed in the direction more toward the center of the first recess portion 313 than when reflected from the plane mirror because the first recess portion 313 is the concave mirror.

The first ray 21-1 and the second ray 21-2 reflected at the first recess portion 313 transmit to the second region 322 of the composite optical element 320. Since the second region 322 has the convex shape, the first ray 21-1 and the second ray 21-2 are refracted in the direction toward the center of the composite optical element 320 due to a refractive index difference of the medium.

The first ray 21-1 and the second ray 21-2 incident on the second region 322 of the composite optical element 320 are emitted through the second recess portion 323 of the composite optical element 320. Since the second recess portion 323 is the concave lens, the first ray 21-1 and the second ray 21-2 are refracted in the direction toward the outer portion of the composite optical element 320 and proceed. The first ray 21-1 and the second ray 21-2 are focused at the first focal point position 31 on the object to be processed 10 to form the focal point.

When using only the reflection mirror to prevent the chromatic aberration, beam uniformity is limited due to the spherical aberration. However, in the case of the laser processing apparatus according to embodiments of the present invention, the chromatic aberration is prevented or reduced by using both the reflective mirror and the transmissive lens, and the aberration compensation on the lens surface may be achieved, thereby also improving the beam uniformity and the beam quality.

It should be apparent to a person of ordinary skill in the art that the first ray 21-1 and the second ray 21-2 are only described as an example, and the first laser beam 21 may include more rays.

Hereinafter, the proceeding path of a third ray 22-1 and a fourth ray 22-2 will be representatively described in order to describe the proceeding path of the second laser beam 22. The detailed description of the same content as described with respect to the first laser beam 21 may be omitted.

Unlike the first laser beam 21, the path of the second laser beam 22 is adjusted to form the focal point at the second focal point position 32. As described for the first laser beam 21, the third ray 22-1 and the fourth ray 22-2 pass through the through-hole optical element 310 through the through hole 311 and are reflected at the first region 321 of the composite optical element 320. The third ray 22-1 and the fourth ray 22-2 reflected from the first region 321 are reflected again at the first recess portion 313 of the through-hole optical element 310 to sequentially pass the second region 322 and the second recess portion 323 of the composite optical element 320 and to be refracted. The third ray 22-1 and the fourth ray 22-2 are focused at the second focal point position 32 of the object to be processed 10 to form the focal point.

It should be apparent to a person of ordinary skill in the art that the third ray 22-1 and the fourth ray 22-2 are only examples, and the second laser beam 22 may include more rays.

The object to be processed 10 includes the active region 50 in which the focal point is formed to be processed, and the non-active region 40 where the focal point may not be formed.

The first region 321 of the composite optical element 320 does not transmit the laser beam 20 but reflects the laser beam 20 in the direction in which the through-hole optical element 310 is disposed. As a result, the focal point may not be disposed at the partial region of the object disposed to the bottom of the first region 321.

The non-active region 40 may have the same shape as the first region 321, projected from the first region 321 of the composite optical element 320. However embodiments of the present invention are not limited thereto and, according to some examples, the non-active region 40 may not have exactly the same shape as the first region 321 of the composite optical element 320 due to reflection and refraction of the laser beam 20, and the shape of the first region 321 may be partially distorted. Therefore, the position, size, or shape of the first region 321 may be determined according to the position, size, and shape of the object to be processed 10.

Figure 11:
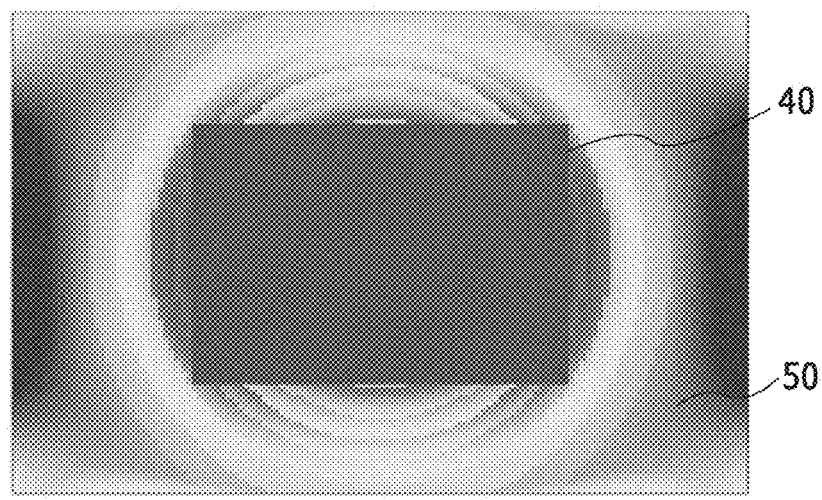
FIG. 11 is an image of an object to be processed when using a laser processing apparatus according to an exemplary embodiment of the present invention.

FIG. 11 is an image showing a spot size distribution of the laser beam radiated toward the object to be processed when emitting the laser beam by using the laser processing apparatus according to an exemplary embodiment of the present invention.

In the case of a laser processing apparatus using the transmissive lens, the laser beam is transmitted through the entire surface of the lens, so the focal point may be formed on the entire surface of the object to be processed. In contrast, since the laser processing apparatus according to an exemplary embodiment of the present invention includes the first region that does not transmit the laser beam in the composite optical element, the non-active region 40 where the laser beam does not reach exists at the partial regions under the first region.

The position of the focal point depending on the wavelength of the laser beam irradiated by the laser processing apparatus using the transmissive lens, and the laser processing apparatus according to an exemplary embodiment of the present invention is described with reference to FIG. 12 and FIG. 13.

Figure 12:
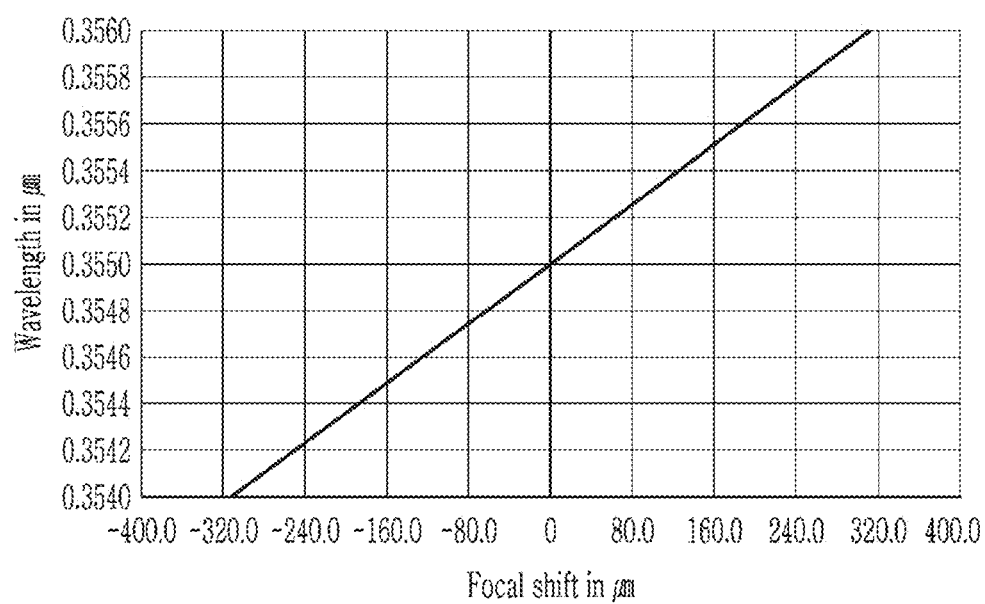
FIG. 12 is a graph showing a moving distance of a focal point depending on a wavelength of a laser beam of a laser processing apparatus using a transmissive lens.
Figure 13:
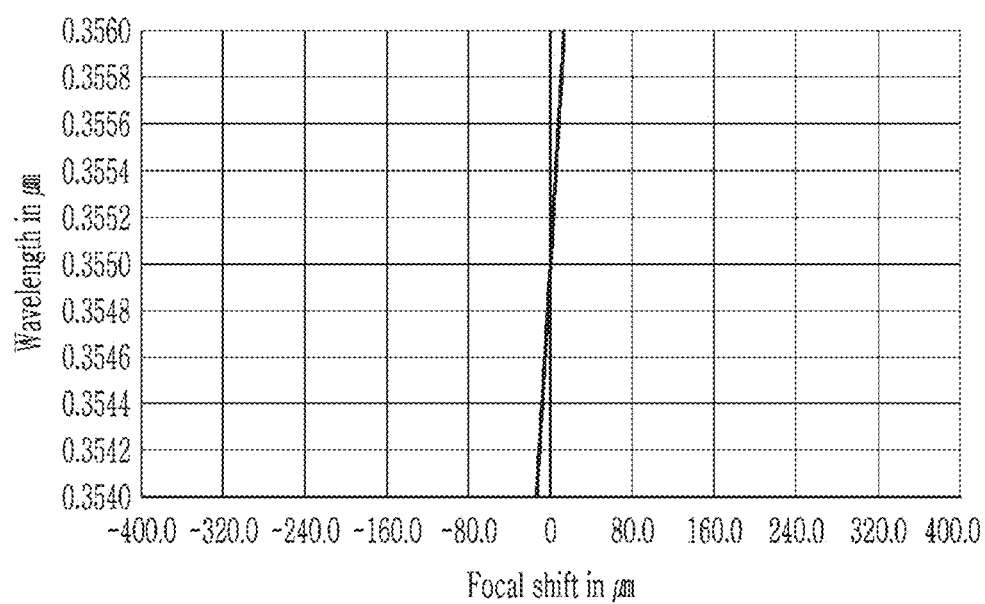
FIG. 13 is a graph showing a moving distance of a focal point depending on a wavelength of a laser beam of a laser processing apparatus according to an exemplary embodiment of the present invention.

FIG. 12 is a graph showing a moving distance (e.g., shift) of a focal point depending on a wavelength of a laser beam of a laser processing apparatus using a transmissive lens, and FIG. 13 is a graph showing a moving distance of a focal point depending on a wavelength of a laser beam of a laser processing apparatus, according to an exemplary embodiment of the present invention.

Referring to FIG. 12, in the case of the laser processing apparatus using the transmissive lens, in the region in which the wavelength is from 354 nm to 356 nm, there is a difference in the focal point position of about 620 μm. This is due to the effect of the chromatic aberration generated when the laser beam passes through the lens.

Referring to FIG. 13, in the case of the laser processing apparatus according to an exemplary embodiment of the present invention, at the region in which the wavelength is from 354 nm to 356 nm, there is a difference in the focal point position of about 24 μm. In other words, the difference in the focal point position (e.g., the focal point shift) of the laser processing apparatus according to some embodiments of the present invention is only $1/25$ of that of the laser processing apparatus using the transmissive lens in the same wavelength range, and it is confirmed that the effect of chromatic aberration is very small.

As the pulse duration of the laser beam is shorter, the spectral band width is widened. In the laser processing apparatus using transmissive lens, when using the laser beam with the short pulse duration, the position difference of the focal point according to the wavelength becomes large, and the accuracy of the laser processing apparatus is low.

However, the laser processing apparatus according to some embodiments of the present invention uses a small number of (e.g., the minimum number of) transmissive lenses, so that the effect of the chromatic aberration is very small. Therefore, even if the pulsed laser beam with a pulse duration of femtoseconds is used, the position difference of the focal point (e.g., the focal point shift) depending on the wavelength is not large, and the accuracy and the processing quality of the laser processing apparatus are improved.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, a specific quantity or range recited in this written description or the claims may also encompass the inherent variations in measured or calculated values that would be recognized by those of ordinary skill in the art.

As used herein, the terms "use," "using," and "used" may be considered synonymous with the terms "utilize," "utilizing," and "utilized," respectively.

While this invention has been described in connection with what is presently considered to be practical exemplary embodiments, it is to be understood that the invention is not limited to the disclosed embodiments, but, on the contrary, is intended to cover various suitable modifications and equivalent arrangements included within the spirit and scope of the invention as defined by the appended claims and equivalents thereof.

DESCRIPTION OF SOME OF THE SYMBOLS

10: object to be processed
20: laser beam
30: processing trace
40: non-active region
50: active region
100: light source
200: position adjustment optical system
210: first galvano mirror
220: second galvano mirror
300: light converging optical system
310: through-hole optical element
311: through hole
312: flat part
313: first recess portion
320: composite optical element
321: first region
322: second region
323: second recess portion

What is claimed is:

1. A laser processing apparatus comprising:
    a light source configured to generate a laser beam; and
    a light converging optical system configured to converge the laser beam to a focal point at an object to be processed, the light converging optical system comprising a through-hole optical element and a composite optical element under the through-hole optical element,
    wherein the through-hole optical element comprises a first recess portion configured as a concave mirror at a lower surface of the through-hole optical element, and
    wherein an upper surface of the composite optical element is convex and comprises a first region configured to reflect the laser beam and a second region configured to transmit the laser beam.

2. The laser processing apparatus of claim 1, wherein the through-hole optical element has a through hole penetrating a center of the through-hole optical element.

3. The laser processing apparatus of claim 2, wherein the composite optical element comprises a second recess portion that is concave at a lower surface of the composite optical element, the second recess portion being configured to transmit the laser beam.

4. The laser processing apparatus of claim 3, wherein the light converging optical system further comprises a cover between the composite optical element and the object.

5. The laser processing apparatus of claim 3, further comprising:
    a position adjustment optical system on a path of the laser beam and configured to adjust an irradiation position of the laser beam on the object,
    wherein the position adjustment optical system comprises a first galvano mirror configured to determine a position of the focal point on the object along an x axis, and a second galvano mirror configured to determine a position of the focal point on the object along a y axis crossing the x axis.

6. The laser processing apparatus of claim 5, wherein the position adjustment optical system further comprises a controller configured to control positions and angles of the first and second galvano mirrors.

7. The laser processing apparatus of claim 3, further comprising:
    a galvano mirror configured to adjusting a position of the focal point on the object along both an x axis and y axis crossing the x axis.

8. The laser processing apparatus of claim 3, wherein the laser beam is a pulsed laser beam.

9. The laser processing apparatus of claim 8, wherein the laser beam has a pulse duration of femtoseconds.

10. The laser processing apparatus of claim 3, wherein a shape of the first region is circular, elliptical, or polygonal.

11. The laser processing apparatus of claim 3, wherein the object comprises a non-active region where the laser beam does not reach and an active region where the laser beam converges at the focal point.

12. The laser processing apparatus of claim 11, wherein the object is fixed to a stage to be movable.

13. The laser processing apparatus of claim 3, wherein a curvature of the first region and the second region of the composite optical element is larger than a curvature of the second recess portion.

14. The laser processing apparatus of claim 3, wherein a curvature of the first region and the second region of the composite optical element is a same as a curvature of the second recess portion.

15. The laser processing apparatus of claim 3, wherein a curvature of the first region and the second region of the composite optical element is smaller than a curvature of the second recess portion.

16. The laser processing apparatus of claim 3, wherein an upper surface of the through-hole optical element has a flat part.

17. The laser processing apparatus of claim 3, wherein the upper surface or the second recess portion of the composite optical element is spherical.

18. The laser processing apparatus of claim 3, wherein the upper surface or the second recess portion of the composite optical element is aspherical.

19. A laser processing apparatus comprising:
   a light source configured to generate a laser beam; and
   a light converging optical system configured to generate a focal point at an object to be processed, the light converging optical system comprises a through-hole optical element having a through hole penetrating the through-hole optical element, a composite optical element between the through-hole optical element and the object, and an optical element moving device,
   wherein an upper surface of the through-hole optical element is flat, and a thickness of the through-hole optical element is thickest at an edge of the through-hole optical element and thinnest at a center of the through-hole optical element, and a lower surface of the through-hole optical element is configured to reflect the laser beam,
   wherein curvature centers of an upper surface and a lower surface of the composite optical element are under the composite optical element, the upper surface of the composite optical element comprising a first region configured to reflect the laser beam and a second region configured to transmit the laser beam, the lower surface of the composite optical element being configured to transmit the laser beam incident from the second region, and
   wherein the through-hole optical element and the composite optical element are movable by the optical element moving device.

20. The laser processing apparatus of claim 19, further comprising:
   a position adjustment optical system configured to adjust a path of the laser beam generated from the light source, the position adjustment optical system comprising a galvano mirror.

* * * * *